United States Patent [19]

Lange

[11] 4,005,461
[45] Jan. 25, 1977

[54] DRIVING DEVICE FOR FILM TRANSPORT AND SHUTTER COCKING LEVER FOR A CAMERA

[75] Inventor: Karl Heinz Lange, Bunde, Germany

[73] Assignee: Balda-Werke Photographische Gerate & Kunststoff GmbH & Co. KG, Bunde, Germany

[22] Filed: Feb. 24, 1976

[21] Appl. No.: 660,758

[30] Foreign Application Priority Data

Mar. 12, 1975 Germany .......................... 2510724

[52] U.S. Cl. .............................................. 354/204
[51] Int. Cl.² ........................................ G03B 17/42
[58] Field of Search .......... 354/204, 205, 206, 212, 354/213, 251

[56] References Cited

UNITED STATES PATENTS 3,380,363  4/1968  Sommermeyer .................. 354/204

FOREIGN PATENTS OR APPLICATIONS 231,082  5/1944  Switzerland ...................... 354/204

Primary Examiner—John Gonzales
Attorney, Agent, or Firm—Blum, Moscovitz, Friedman & Kaplan

[57] ABSTRACT

A drive device for film transport and shutter cocking lever for a camera whose film has a hole associated with each picture frame position and having a film transport wheel coupled to a spool core wherein a first gear wheel is concentrically connected with a film transport wheel and a second gear wheel is seated and freely revolvable, wherein a carrier conveys a coupling gear wheel which in a first position of the carrier is simultaneously in engagement with the first and second gear wheels and out of engagement in a second position and wherein the engagement occurs in a manner depending upon the position of the shutter cocking lever, or in a manner depending upon the positon of a spring-loaded pawl. The pawl is pivoted by engagement against a moving surface driven by the second gear wheel and having notch recesses therein. The pawl, in a swung-out position, holds the carrier so that the first and second gear wheels are engaged with the coupling gear wheel, and in a swung-inwardly position, releases the carrier, setting it free for disengagement of the coupling gear wheel.

13 Claims, 4 Drawing Figures

DRIVING DEVICE FOR FILM TRANSPORT AND SHUTTER COCKING LEVER FOR A CAMERA

BACKGROUND OF THE INVENTION

This invention relates to a device for the drive of a shutter cocking lever and for the transport of the film, in a camera wherein the film has a hole associated with each picture frame position, and having a film transport wheel which is coupled with the spool core.

Prior to the present invention, in devices of this nature, the film transport wheel possessed a revolving internal toothing which was constructed for engagement with a pin positioned on a lever. This pin, which extended downwardly in the internal toothing, also projected upwardly into a stationary guide curve. This guide curve controlled the duration of engagement and the route for engagement of the pin in the toothing. In this manner the lever was moved to and fro between two end positions and thus rendered the shutter cocked.

The important disadvantage inherent in this known construction resides in the fact that the lever produces to-and-fro rectilinear drive motion. This becomes disadvantageous if, besides the drive of the shutter, there also occurs at the same time a drive of a revolving element, as for example, the drive of a flash cube carrier. In another known device of this type, a slipping coupling is provided between the film transport wheel and the shutter setter. The route of the film transport is greater than the route for the tightening of the shutter cocking lever. As a result thereof, there is developed during the revolution of the film transport wheel an irregular power requirement and more specifically in this manner, the power requirement towards the end of the movement of rotation becomes greater than that at the beginning. If the shutter has already been rendered cocked and merely the rest of the film still must be transported the frictional force of the slipping coupling must be overcome and this force necessarily must be greater than the force required for the pivoting of the shutter cocking lever. The camera operator on some occasions will prematurely discontinue the actuation of the film transport wheel when the power requirement becomes greater, at which time, only the shutter has been rendered cocked and the film has not yet been transported completely. Thus, the rise in the power requirement towards the end of the movement of the film transport presents a considerable disadvantage in the power-locked coupling between film transport and film drive.

Considering this state of technology as a point of departure, the fundamental purpose of the present invention is to retain the advantages of the form-locked coupling as against the power-locked coupling, and nonetheless provide a rotating drive movement instead of a rectilinear drive movement moving to and fro for the shutter drive.

SUMMARY OF THE INVENTION

In accordance with the present invention, this objective is accomplished through the use of a first gear wheel firmly connected with the film transport wheel and arranged concentrically therewith, and a second gear wheel which is seated to be freely rotary relative to said first gear wheel. A carrier conveys a coupling gear wheel between a first position at which the coupling gear wheel is in simultaneous engagement with the first and second gear wheels and a second position at which the coupling gear wheel is out of such engagement, and wherein the engagement becomes operative in a manner dependent upon the position of the position of a spring-loaded pivotable pawl, said pawl riding on a moving surface driven by the second gear wheel and formed with notch recesses, said pawl holding the carrier in its first position when said pawl is in swung-out position, and releasing the carrier for disengagement of the coupling gear wheel when the pawl is in an inwardly-swung position.

The improved device of the present invention exhibits a further advantage in that the power requirement of the film transport decreases in the course of the drive movement in contradistinction to utilizing a slipping coupling so that the operator perforce transports the film all the distance to the detent. In the improvement of the present invention, the shutter cocking device permits utilization, in an extremely simple manner of the drive of the flashcubes under conditions wherein the arrangement of the flashcube assembly can be provided on various elements of the device. In this regard, for example, the lower face of the flashcube drive or of the flashcube assembly can be toothed to form part of one of the gears in accordance with the invention or to couple with such a gear. Still a further considerable advantage of the device of the present invention resides in its mode of construction, permitting a saving of space. This is important especially in the use of small-picture and micro-picture cameras.

In accordance with a further modification of the invention, the coupling gear wheel can exhibit two concentric areas with differing diameters which are amenable to entry into engagement with the first gear wheel, and with the second gear wheel concentric thereto, each having a corresponding diameter. Through such design, it is possible to drive the second gear wheel at a number of revolutions diverging from the number of revolutions of the first gear wheel and, accordingly, from the number of revolutions of the film transport wheel. Thus, in this embodiment, the coupling gear wheel is comprised of two gear wheel areas superjacently arranged, or two firmly connected gear wheels having differing diameters.

In accordance with the present invention, it is found that the carrier for the coupling gear wheel should comprise a pivoting angular lever, which, when pivoted in a first direction, can bring the coupling gear wheel into simultaneous engagement with said first and second gear wheels, and when pivoted in a second direction, brings said coupling gear wheel out of such engagement. In an advantageous embodiment, the driven moving surface is located on a gear wheel the lower face of which carries shutter cocking cams for the swiveling of the shutter cocking lever wherein the number of notch recesses corresponds to the number of shutter-cocking cams.

The arresting of the angular lever in the position at which the coupling gear wheel is engaged against the first and second gear wheels is carried out in an advantageous manner by means of a pin slot coupling between the angular lever and a slide movable in the swiveling plane of the shutter cocking lever, as well as by means of a notch lug of the pawl which interlocks in the swung-out position of the pawl with the free end of the angular lever.

In another preferred modification of the invention, the slide is conducted by means of two longitudinal slots for on one receiving the bearing gudgeon for the angular lever, and on the other receiving the bearing gudgeon for the pawl.

In a still further modification of the invention, a common drawspring can extend between the slide and the free end of the pawl. Furthermore, it is also within the scope of the invention, that upon cocking of the shutter, the shutter-cocking lever can shift the slide from a first end position into a second end position.

Accordingly, it is an object of this invention to provide an improved device for film transport and a shutter cocking lever for a camera.

Another object of the invention is to provide an improved device for film transport and a shutter cocking lever wherein the power requirement of the film transport decreases in the course of the drive movement.

A further object of the invention is to provide an improved device for film transport and a shutter cocking lever wherein the coupling sprocket is comprised of two sprocket wheels areas of differing diameters.

Still other objects and advantages of the invention will in part be obvious and will in part be apparent from the specifications and drawings.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
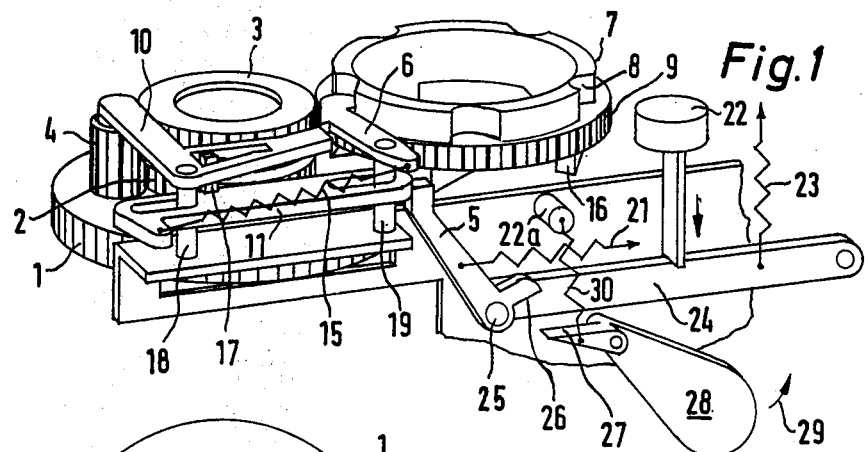
FIG. 1 is a perspective view of the improved device of the present invention.
Figure 2:
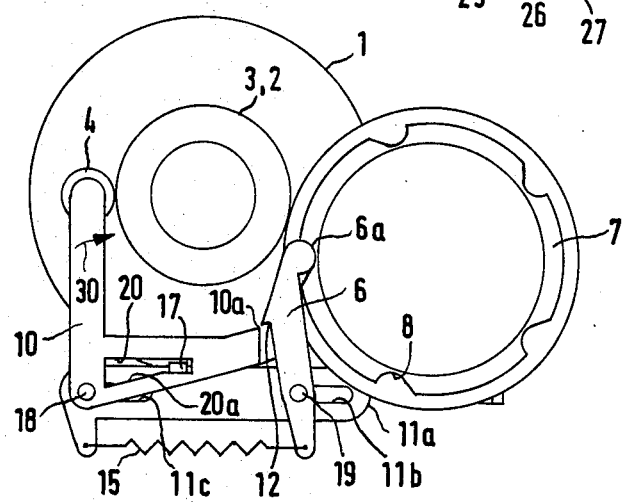
FIG. 2 and FIG. 3 are top-plan views of the members of FIG. 1 in different positions.
Figure 3:
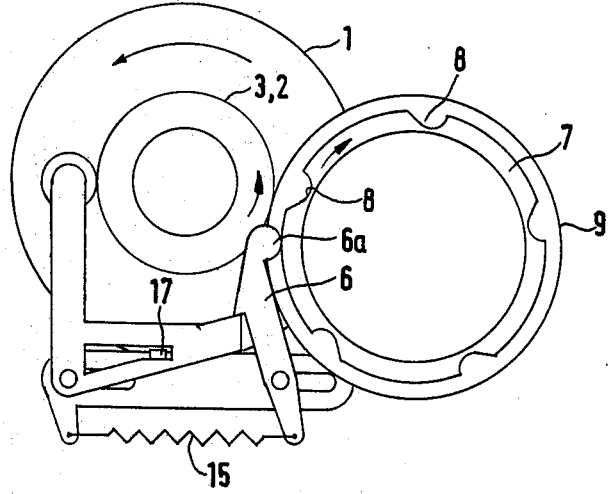

As shown in FIGS. 1 through 3, a film transport wheel 1, in a manner not shown in the drawings, is coupled with the spool core of the film spool and carries on its upper face a concentrically arranged first gear wheel 2, firmly connected to the film transport wheel. On the first gear wheel 2 there is seated a second gear wheel 3, positioned concentrically with and revolvable relative to the first gear wheel 2, wheel 3 having the same diameter as that of the first wheel 2. The second gear wheel 3 is at all times in engagement with the toothing of a gear wheel 9, which on its lower face carries shutter cocking cams 16 for engaging the shutter cocking lever 5. On its upper face, a moving or camming surface 7 turned with the gear wheel 9 is provided, said moving surface being formed with notch recesses 8. The number of notch recesses 8 corresponds to the number of shutter cocking cams 16.

A notch pawl 6 engages and rides on moving surface 7, is seated in stationary and pivotal arrangement on a bearing gudgeon 19 and is pivoted between the two positions by virtue of the shape and arrangement of the notch recesses 8, namely, between the arrangement shown in FIG. 2 and that shown in FIG. 3. The round head 6a of notch pawl 6, as more particularly shown in FIG. 2, is drawn by the force of the drawspring 15, against the moving surface 7, and when in registration therewith, into respective recesses 8.

An angular lever 10 is seated pivotally on a stationary bearing gudgeon 18 as more particularly shown in FIG. 1. The angular lever bears at the end of a lever arm a coupling gear wheel 4, as more particularly shown in FIG. 1, which, according to the particular pivotable position of the angular lever is either in engagement simultaneously with the toothing of the first gear wheel 2 and of the second gear wheel 3, or is extracted from the toothings of both gear wheels.

As more particularly shown in FIG. 1, a slide 11 is seated, via slots 11b and 11c in a longitudinally displaceable manner on bearing gudgeons 18 and 19 respectively in the pivotal plane of the shutter cocking lever 5. A draw spring 15 is stretched between one end of the slide 11 and the free end of the notch pawl 6 as shown in FIGS. 1, 2 and 3. The slide 11 carries an upwardly pointing lobe 17, as shown in FIGS. 1 and 2, which is displaceable in a slot 20 in angular lever 10 as more particularly shown in FIG. 2. Slot 20 is widened in the region thereof on its side away from shutter tightening lever 5 to permit the pivoting of the angular lever 10, as more particularly shown in FIG. 2.

The shutter cocking lever 5, at the juncture at which the shutter is released, is drawn by spring 21 to the right as viewed in FIG. 1, all the way to the adjacency of a lug 22a. In FIG. 1 the shutter cocking lever is shown in its cocked position. When the release mechanism 22, as shown in FIG. 1, is depressed with the surmounting of the force of spring 23 as shown in FIG. 1, the bearing gudgeon 25 about which shutter cocking lever 5 pivots, is taken along downwardly upon the rod 24. The upper end of the shutter cocking lever 5 (as viewed in FIG. 1) glides downwardly on the vertical surface of the shutter cocking cam 16 until the shutter cocking cam sets the shutter cocking lever free. Thereafter, under the effect of the force of spring 21, the shutter cocking lever 5 is pivoted in a clockwise direction, as viewed in FIG. 1. Lug 25 of shutter cocking lever 5, at such juncture, strikes upon lug 27 of the shutter lamella 28 and hurls the latter, overcoming of the force of the spring 30, in the direction of arrow 29 in FIG. 1.

As shown in FIG. 1, the shutter cocking lever 5 is in a cocked position. This lever lies adjacent to the end 11a of the slide 11, and slide 11 is placed in its left end position. Lobe 17 is in the widened area of slot 20. In this position, the coupling gear wheel 4 is free from the toothings of the first gear wheel 2 and that of the second gear wheel 3. The device accordingly is in the position of the run-off movement, a phase in which the tightening of the shutter has already occurred and the film has been shifted over the last portion of the transport route at the turning of the film transport wheel 1. Following release of the shutter, the shutter cocking lever 5 is positioned at lug 22a. As a result, end 11a of the slide is free and the slide, under the effect of the force of the draw spring 15, is able to occupy the right end position shown in FIG. 2. In such instance, lobe 17 has traveled along on the inclined surface 20 in the narrow area of the slot. At this juncture, the lever arm of angular lever 10, carrying the coupling gear wheel 4, has moved in the direction of the arrow 30 (FIG. 2). In this position, the coupling gear wheel 4 is placed in engagement both with the toothing of the first gear wheel 2 and also with the toothing of the second gear wheel 3. In such condition as shown in FIG. 2, the angular lever is blocked in the position shown in FIG. 2.

Upon turning of the film transport wheel 1, both the first gear wheel 2 and the second gear wheel 3 are turned. At this point the gear wheel 9 is turned and takes along both the upper surface 7 and also the shutter cocking cams 16. By reason of the rotary motion of gear wheel 9, the round head 6a of the notch pawl 6 leaves a notch recess 8 and comes to rest upon the moving surface 7. At this juncture, the notch 12 of notch lug 11 places itself behind the edge 10a of the angular lever 10 and takes over the arrest of the angular lever as shown in FIG. 3. Upon further turning of the film transport wheel 1 the shutter cocking lever is pivoted in the counterclockwise direction (as viewed in FIG. 1) by the shutter cocking cam 16, and comes to rest at a point adjacent to the right end 11a of the slide 11, moving the slide to the left (as viewed in FIG. 2) and positioning the slide lobe 17 in the left end position in slot 20. Upon attainment of the left end position of the shutter cocking lever, the round head 6a of pawl 6 falls into the next notch recess 8 to release edge 10a of angular lever 10 from engagement by notch 12 of pawl 6. Since lobe 17 lies in the widened area of slot 20, arresting of the angular lever 10 no longer occurs and coupling gear wheel 4 disengages. This condition is shown in FIG. 1. Upon further turning of the film transport wheel only a further transport of the last film segment occurs.

Figure 4:
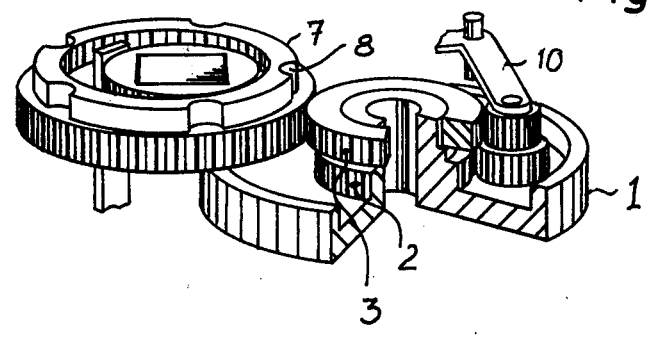
FIG. 4 is a fragmentary partially sectional perspective view of another embodiment of FIG. 1.

In place of a continuous coupling gear wheel 4, a coupling gear wheel having tooth systems of varying diameter can be substituted as shown in FIG. 4. Accordingly, in such instance, the diameters of the first gear wheel 2 and of the second gear wheel 3 are correspondingly different. Furthermore, in this instance, the axial distance between the axis of the coupling gear wheel and the common axis of the first and second gear wheels remain alike.

It will thus be seen that the objects set forth above and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A drive device for a film transport and shutter cocking lever for a camera whose film is indexed once per frame and having a film transport wheel coupled to a spool core and a displaceable shutter cocking lever, comprising a first gear wheel concentrically connected with said film transport wheel and a second gear wheel mounted for free rotation relative to said first gear wheel; a displaceable carrier; a coupling gear wheel carried by said carrier for displacement between a first position at which said coupling gear wheel simultaneously engages said first and second gear wheels and a second position at which said coupling gear wheel is out of such engagement; a moving surface formed with notches therein and operatively coupled to said second gear wheel for displacement thereby, a pivotably mounted pawl; means for biasing said pawl against said moving surface to position said pawl in an inwardly position when resting in one of said notches and an outwardly position when out of said notches; and means selectively coupling said carrier, pawl and shutter cocking lever so that the position of said carrier in one of its first and second positions depends on the respective positions of said pawl and shutter cocking lever, said carrier being positioned in its first position at at least one position of each of said pawl and shutter cocking lever.

2. The device as claimed in claim 1, wherein said coupling gear wheel is formed with two concentric geared areas having differing diameters, each said area being positioned to be brought into engagement with one of said gear wheel and said second gear wheel, said first and second gear wheels being concentric and having respective diameters for mating with the associated area of said coupling gear wheel.

3. The device as claimed in claim 1, wherein said carrier for said coupling gear wheel is a pivotable angular lever which is mounted to bring said coupling gear wheel in its first oscillating position into engagement simultaneously with said first and second gear wheels and in its second oscillating position out of such engagement.

4. The device as claimed in claim 1, wherein the driven moving surface is seated on a further gear wheel, shutter cocking cams carried by said further gear wheel and positioned for displacement of said shutter cocking lever between a released position and a cocked position, and wherein the number of notch recesses corresponds to the number of shutter cocking cams present.

5. The device as claimed in claim 3, wherein said selective coupling means includes a slide movable in the plane of oscillation of the shutter cocking lever, a pin-slot coupling means between said slide and said angular lever adapted to hold said angular lever in its first position at a first position of said slide and to permit positioning of said angular lever at its second position at a second position of said slide.

6. The device as claimed in claim 5, wherein said slot is formed with a narrow region and a wider region, said pin resting in the narrow region at said first position of said slide and in said wider region at said second position of said slide.

7. The device as claimed in claim 6, wherein said slot is formed with an incline between the narrow and wider regions thereof, said pin riding on said incline when displaced between said second and first positions of said slide to displace said lever between its second and first positions.

8. The device as claimed in claim 7, wherein said shutter cocking lever is displaceable between a released and a cocked position, said slide being displaced from its first to its second position when said shutter cocking lever is displaced from its released to its cocked position.

9. The device as recited in claim 8 including means for biasing said slide in its first position to return said slide to said first position when said shutter cocking lever is displaced from its cocked to its released position.

10. The device as claimed in claim 5, including first and second bearing gudgeons for respectively pivotably supporting said pawl and angular lever, said slide being formed with two longitudinal slots for receiving said bearing gudgeons to guide the displacement of said slide.

11. The device as claimed in claim 5, including means for biasing said slide and a free end of said pawl toward each other.

12. The device as claimed in claim 5, wherein said shutter cocking lever is displaceable between a released and a cocked position, said shutter cocked lever shifting said slide from its first position into its second position as said shutter cocking lever is shifted from its released to its cocked position.

13. The device as claimed in claim 3, wherein said selective coupling means includes a notch lug on said pawl positioned for engaging a free end of said angular lever when said pawl is in a free end of its outwardly position to retain said angular lever at its first position.

* * * * *